Patented Jan. 26, 1954

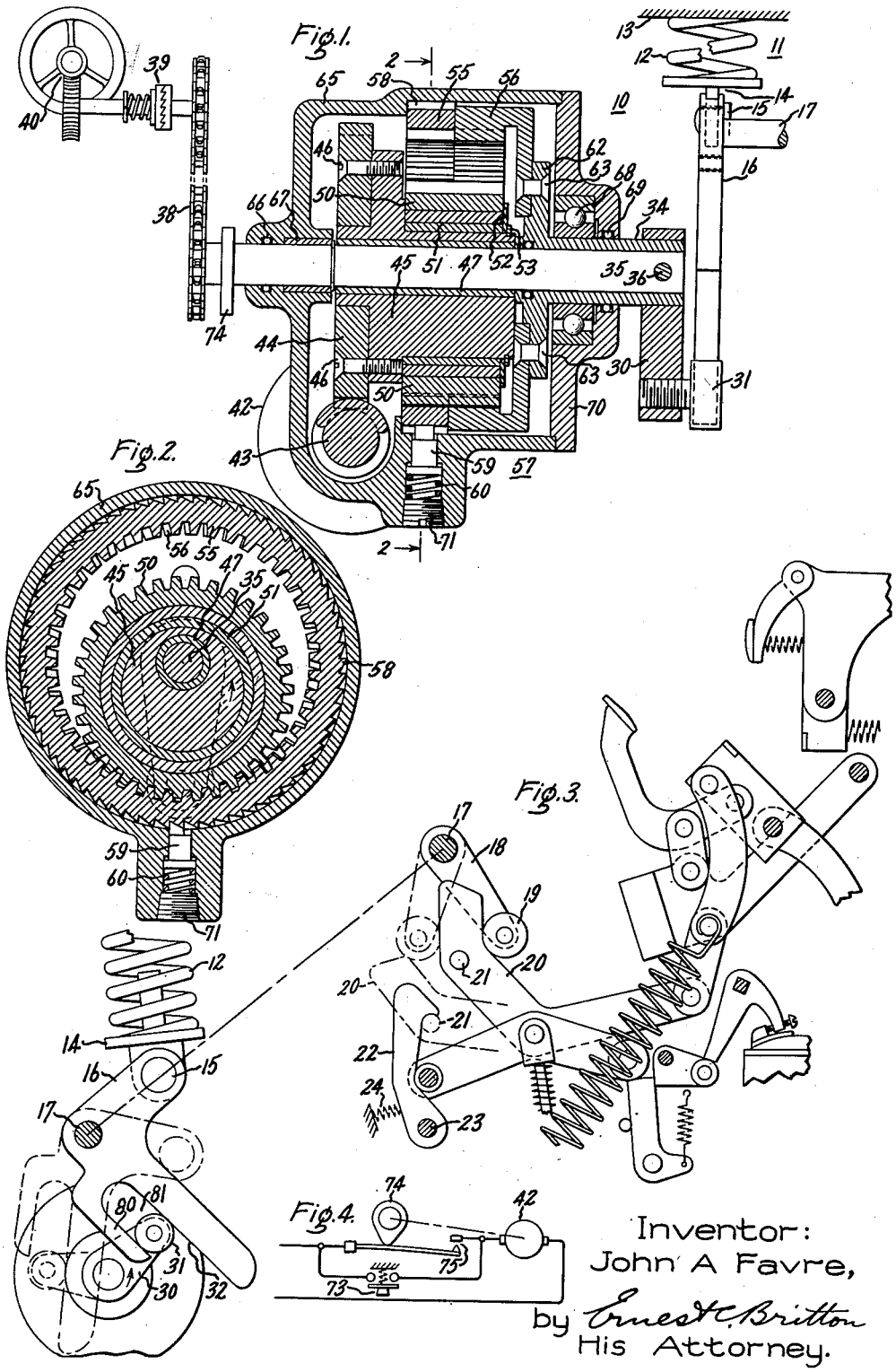

2,667,076

UNITED STATES PATENT OFFICE 2,667,076

ENERGY STORING OVERRUNNING OPERATING DEVICE

John A. Favre, Drexel Hill, Pa., assignor to General Electric Company, a corporation of New York Application November 16, 1950, Serial No. 196,075

12 Claims. (Cl. 74—2)

The invention relates to operating devices for circuit breakers and the like and the principal object is to provide an improved electric motor driven energy storing overrunning operating device suitable for closing heavy-duty circuit breakers or in other service where a suddenly releasable powerful operating force is required.

Another object is to provide an energy accumulator, preferably in the form of a powerful compression spring, for quickly operating a load with an electric motor driven charging mechanism having a member revolving in an orbit for charging the accumulator during the final part of each revolution of the orbital member and provided with an overrunning drive connection to free the orbital member from the motor so that this member is freely driven when the energy stored in the accumulator quickly operates the load during the initial part of each revolution of the orbital member.

Another object is to provide an improved motor driven irreversible force amplifying mechanism with a one-way overrunning drive connection and with a control system for enabling a small electric driving motor to automatically charge a powerful energy accumulating spring and hold the spring charged as the motor is automatically deenergized but acting as a trigger to suddenly release the energy stored in the spring by overrunning the one-way drive connection upon each reenergization of the motor.

Another object is to provide an improved differentially interconnected unequal toothed gear mechanism having a large force amplifying ratio when one of the differential gears is held against rotation in one direction and a relatively small torque applied to drive the intermeshing planet gear around its orbit by an electric driving motor or the like and thereby rotate a cam arm or orbital member connected with the other differential gear to stress powerful operating springs so as to obtain a powerful source of stored energy that can be suddenly released merely by moving the cam arm or orbital member over center to freely overrun the one gear in the opposite direction. In this way a relatively large operating force can be produced and readily triggered for closing a circuit breaker or for other similar service.

Another object is to enable the amplified power of the driving motor to automatically supplement the energy stored in the springs in case additional operating force is required.

Further objects and advantages of the invention will appear from the following description of the accompanying drawing wherein Fig. 1 is a side sectional view of the operating mechanism embodying the improvements of the present invention; Fig. 2 is a cross-sectional view of the mechanism of Fig. 1 on the line 2—2; Fig. 3 is a schematic view showing the operating mechanism applied for closing a multiple toggle operated heavy duty circuit breaker; and Fig. 4 is a circuit diagram indicating how the driving motor of the rotary mechanism may be controlled.

As shown in Fig. 1, the improved energy storing overrunning operating device indicated generally by the reference character 10 is provided with an energy accumulator 11 in the form of a heavy coil compression spring 12 with its upper end fixed against a suitable abutment 13 and its lower end engaging a spring seat 14 that is pivotally connected by means of pin 15 to operate the bell crank 16 upon the release of the energy stored in the spring 12. Upon reverse operation of the bell crank 16, the energy accumulator 11 is charged by compressing the spring 12. As shown more clearly in Fig. 3, the load operating bell crank 16 is fixed to shaft 17 that carries an arm 18 having a roller 19 mounted at the end thereof for engaging with a closing lever arm 20 of a circuit breaker which may be of the improved type described and claimed in my application Serial No. 137,411, filed January 7, 1950, now Patent 2,581,181. In this way the circuit breaker resetting arm 20 is moved to the position shown in the dash-dot lines wherein the pin 21 carried by the arm 20 is engaged by the holding latch 22 that is pivoted on the pin 23 and biased by a suitable spring 24 into latching relation in the path of pin 21. Thus the energy stored in the compression spring 12 is suddenly released to rotate the load operating member or bell crank 16 and thereby rotate shaft 17 to engage roller 19 with the lever arm 20 to quickly close the circuit breaker.

In order to charge the accumulator 11 by compressing spring 12, a rotatable crank arm 30 carries a cam roller 31 at its free end to constitute an orbital element revolving in an orbital path to engage with the flat cam surface 32 of the bell crank 16 so as to practically fully compress spring 12 when the cam roller 31 is moved to the substantially dead center angular position in which it is shown in Fig. 3. Thus the accumulator 11 will be charged during the final or remaining part of each revolution of the orbital element 11, namely from the angular position as shown in dash lines in Fig. 3 in the direction indicated by the arrow substantially to the dead center position as shown in full lines in Fig. 3 and the energy stored in the accumulator will be released to start the initial part of each revolution of cam element 11 when the orbital element is moved over center. The cam operating arm 30 is fixedly mounted upon the end of the quill shaft 34 which surrounds the main shaft 35 with the pin 36 extending therethrough to insure unitary or joint rotation of the quill shaft 34, the main shaft 35 and the cam operating arm 30. The main shaft 35 is shown in Fig. 1 as connected by means of the chain gearing 38 and the releasable one-way clutch 39 with a hand operated worm gearing 40 so that the energy accumulator 11 may be charged by hand in an emergency upon engaging the overrunning clutch 39.

In accordance with the present invention, an improved differential force amplifying and overrunning drive mechanism 57 is provided for rotating the quill shaft 34 to charge the accumulator 11 by means of a relatively small electric driving motor 42. The electric driving motor 42 is shown connected to drive the worm 43 and thereby the intermeshing worm gear 44 with a relatively high force amplifying ratio. The worm gear 44 is fixed to an eccentric 45 by means of the holding screws 46 with the eccentric 45 mounted for free rotation on the main shaft 35 by means of the bearing bushing 47. The eccentric 45 carries a planet gear in the form of a pinion 50 rotatably supported thereupon by means of a suitable antifriction bearing 51 held in place by the washer 52 and the snap ring 53. The planet gear or pinion 50 is formed to mesh with the two juxtaposed internally toothed ring gears 55 and 56 of the differential mechanism 57.

As shown in Fig. 2 the internally toothed floating ring gear 55 preferably is provided with one more tooth than the internally toothed driving ring gear 56 so that a relative displacement of the driving ring gear with respect to the floating ring gear is produced upon each revolution of the planet gear 50 around its orbit, although, if desired, the gear 56 may be specially designed to have the greater number of teeth. Also, the floating ring gear 55 is provided with the ratchet teeth 58 completely around its outer periphery as shown in Fig. 2 and the ratchet pawl 59 is biased by a spring 60 to engage with the teeth 58 so as always to prevent rotation of the floating ring gear 55 in the direction of rotation of the planet gear 50 around its orbit. As a result, the coaxial driving ring gear 56 is advanced one tooth upon each rotation of the planet gear 50 and thus provides a large force amplifying ratio in the transmission of the power of the driving motor 42, that multiplies the force amplification provided by the worm gearing 43 and 44. In this way, an irreversible large amplification of the torque of motor 42 is transmitted to the ring gear 56 which is secured to the flange 62 of the quill shaft 34 by means of the rivets 63 to produce the necessary heavy force on rotating arm 30 to carry the roller 31 into camming engagement with the cam face 32 of the bell crank 16 and comprises the spring 12 to thereby charge the accumulator 11.

All operating parts of the improved force amplifying differential and overrunning drive mechanism 57 are shown enclosed within a cylindrical casing 65 that is provided with suitable antifriction bearing 67 for supporting one end of the main shaft 35, and suitable antifriction bearing 68 is provided in the removable cover 70 for supporting the quill shaft 34 surrounding the other end of the main shaft 35. Thus, the cover 70 and the casing 65 enable all operating parts to be totally enclosed and the casing charged with a suitable bath of lubricating oil since the removable plug 71 seals the recess in which the ratchet pawl 59 and its biasing spring 60 are seated and the oil rings 66 and 69 seal the rotating shafts 35 and 34.

As indicated in the circuit diagram of Fig. 4, the motor 42 may be automatically operated to charge the energy accumulator 11 by means of a suitable cam 74 operatively connected with the orbital member 31 by the main shaft 35 to permit the switch 75 to close in accordance with its bias to automatically energize the motor 42 after the orbital member 31 starts a partial revolution away from its substantially dead center position shown in full lines in Fig. 3 and thereby maintain the motor 42 energized until just before the roller arm 30 is automatically returned to its dead center position in which it is shown in Fig. 3. Then the motor 42 is automatically stopped when switch 75 is opened by cam 74. Thus the automatic operation of motor 42 is always continued for a sufficient interval to fully charge the accumulator 11 by fully compressing the spring 12 with the power of motor 42 amplified both by the worm gears 43 and 44 and the force amplifying differential gearing 57 formed by the internally toothed ring gears 55 and 56 and the intermeshing planet gear 50. Due to the irreversible character of such high force amplification mechanism, the roller arm 30 is held substantially in or just short of its dead center position as shown in Fig. 3 when the motor 42 is not energized.

In order to release the energy stored in the spring 12 all that is necessary is to operate the pushbutton 73 and thereby energize motor 42 sufficiently to move the roller or orbital element 31 over center. Immediately the energy stored in spring 12 becomes effective to continue rotation of the roller arm 30 from the dead center position since both of the ring gears 55 and 56 are then free to rotate in mesh with the planet gear 50. This is due to the fact that the floating ring gear 55 is now rotated in the same direction as the ring gear 56 and therefore freely overruns the ratchet pawl 59 to free the orbital member 30 from motor 42. Consequently, a very sudden release of the energy stored in the spring 12 is effected immediately upon the operation of the roller 31 over center and is applied in the manner previously described to operate the load operating bell crank 16 to close the circuit breaker or operate any other device desired.

In order to enable the amplified power of the driving motor 42 to automatically supplement the energy stored in spring 12 in case some additional operating force might be required to move the load operating bell crank 16 to the breaker closed position, the bell crank is provided with an auxiliary arm 80 projecting parallel with the cam face 32. In this way, a slot 81 is formed for receiving the roller 31 therein when the rotation of the arm 30 is performing a breaker closing operation. Thus in case the sudden release of the energy stored in spring 12 is unable to fully complete the load operating movement of the bell crank by overrunning the ratchet pawl 59 in the manner previously described, then the power of motor 42 becomes effective to engage roller 31 with the inner parallel cam face on the auxiliary arm 80 and thereby add the amplified power of the motor to the energy stored in spring 12 to complete the operation of the load operating bell crank 16 until the arm 30 reaches its angular position which limits the movement of arm 32 in releasing the energy of spring 12 as shown by the dash lines in Fig. 3. Thereupon the rotation of crank 30 will be continued by motor 42 until cut off by switch 75 just short of its dead center position so as to operate the bell crank 16 and recharge the spring 12 while the latch 22 meanwhile holds the breaker closed.

Thus by the operative connection of switch 75 with the orbital element 31, the motor 42 is always automatically energized upon starting each partial revolution of the orbital element 31 from a predetermined substantially dead center angular position to its other angular position in which the element limits the release of the energy of accumulator 11. Such partial revolution of the orbital element 31 may be produced with an overrunning of the motor 42 upon a full release of the energy of accumulator 11 to quickly close the breaker or by adding the power of the energized motor 42 to the energy of the accumulator 11 whenever required to effect the closing of the breaker. In either case, the motor 42 will always be maintained energized by the cam operated switch 75 when the orbital member 31 is in its accumulator energy release limiting position and thereby always will drive this orbital element member to recharge the accumulator 11 during the remainder of each revolution of the orbital element. The motor 42 is automatically de-energized by the opening of switch 75 to end each revolution of the orbital element 31 as this element approaches the predetermined angular position.

What I claim as new and desire to secure by Letters Patent of the United States is:

1. In combination, an energy accumulator having mechanism for operating a load, and an electric driving motor having mechanism including an orbital member for charging the accumulator during a partial revolution of the member and provided with a one-way over-running connection for freeing the member from the motor when the energy stored in the accumulator operates the load during the remainder of the revolution of the orbital member.

2. An electric motor driven energy storing overrunning operating device having in combination an energy accumulator having a pivoted load operating member provided with a slot, a rotatable member having a roller for engaging with the load operating member to charge the accumulator upon rotation of the rotatable member to one angular position from another angular position and for engaging with the slot in the load operating member to supplement the release of the energy stored in the accumulator for operating the load operating member upon rotation of the rotatable member from the one angular position to the other angular position, and an electric driving motor having means including a one-way overrunning drive connection for driving the rotatable member to the one position and overrunning to free the rotatable member from the motor when the energy accumulator operates the load operating member.

3. An energy storing overrunning operating device having in combination an energy accumulator provided with means including an orbital member for charging the accumulator upon movement of the member to a predetermined position and releasing the energy stored in the accumulator upon continued movement of the orbital member over center therefrom, and differential drive mechanism having one differentially driven element provided with a one-way holding means and the other differentially driven element connected to drive the movable member to charge the accumulator whereby the one differentially driven element overruns the one-way holding means upon continued movement of the member from the predetermined position to release the member for operation by the energy stored in the accumulator.

4. An energy storing overrunning operating device having in combination an energy accumulator having an operating member operated thereby and provided with an orbital member for engaging with the operating member to charge the accumulator upon rotation of the orbital member to a predetermined angular position and release the energy stored in the accumulator upon continued rotation of the orbital member over center therefrom, and a differential gear mechanism having a driven planet gear and one differential gear element provided with a one-way holding means and the other differential gear element connected to drive the orbital member to charge the accumulator whereby the one differential gear element overruns the one-way holding means upon continued rotation of the orbital member over center from the predetermined angular position to release the operating member for operation by the energy stored in the accumulator.

5. An energy storing overrunning operating device having in combination an energy accumulator having a pivoted operating arm movable in one direction thereby and provided with an orbital cam member for moving the pivoted arm in the opposite direction to charge the accumulator upon a partial revolution of the cam member and release the energy stored in the accumulator during the remainder of the revolution of the cam member, and differential gear mechanism having a planet gear driven around an orbit and one differential gear element provided with a one-way holding means and the other differential gear element connected to drive the orbital cam member to move the pivoted arm to charge the accumulator whereby the one differential gear overruns the one-way holding means during the remainder of the revolution of the cam member to release the arm for operation by the energy stored in the accumulator.

6. An energy storing overrunning operating device having in combination a force amplifying differential gear mechanism having coaxial internal unequal toothed ring gears and one-way holding means for preventing rotation of one ring gear in a one direction and provided with a rotatable planet gear driven in mesh with the ring gears around an orbit to drive the other ring gear, and an energy accumulator having operating means including an orbital member connected to be rotated by the other ring gear to a predetermined angular position for charging the energy accumulator and thereby provide for release of the energy stored in the accumulator when the member moves over center from the predetermined angular position to jointly rotate both ring gears in the direction to overrun the one-way holding means.

7. An energy storing overrunning operating device having in combination a force amplifying differential gear mechanism having coaxial internal unequal toothed ring gears and ratchet means for preventing rotation of one ring gear in a predetermined direction and provided with a driving eccentric shaft and a planet gear rotatable on the eccentric shaft in mesh with the ring gears around an orbit to drive the other ring gear, and an energy accumulator having operating means including an orbital member connected to be rotated by the other ring gear to a predetermined angular position for charging the energy accumulator and thereby provide for discharge of the accumulator when the member rotates over center from the predetermined angular position to jointly rotate both ring gears in the direction to overrun the ratchet means.

8. An electric motor driven energy storing overrunning operating device having in combination an energy accumulator provided with means including an orbital member for charging the accumulator upon a partial revolution of the member and releasing the energy stored in the accumulator during the remainder of each revolution of the member, and an electric driving motor having force amplifying mechanism provided with an overrunning driving connection for driving the orbital member to charge the accumulator and for overrunning during the remainder of the revolution of the member to release the member from the motor for operation by the energy stored in the accumulator.

9. An electric motor driven energy storing overrunning operating device having in combination a movable load operating member, an energy accumulator having connections with the member to charge the accumulator for biasing the member to move from one position to another position to operate a load, an orbital element having an operating connection with the member to drive the element through a partial revolution upon movement of the member by the energy accumulator from the one position to the other position and to drive the member from the other position to the one position to charge the accumulator during the remainder of each revolution of the element, an electric motor having mechanism for driving the orbital element including an overrunning driving connection for overrunning when the load operating member drives the orbital element, and means including a circuit controlling device having an operating connection with the orbital element for de-energizing the motor when the accumulator is charged.

10. An electric motor driven energy storing overrunning operating device having in combination a movable load operating member, an energy accumulator having connections with the member to charge the accumulator for biasing the member to move from one position to another position to operate a load, an orbital element having an operating connection with the member to drive the element through a partial revolution upon movement of the member by the energy accumulator from one position to the other position and to drive the member from the other position to the one position to charge the accumulator during the remainder of each revolution of the element, an electric motor having mechanism for driving the orbital element during each revolution thereof and including an overrunning driving connection for overrunning when the load operating member drives the orbital element, and switching means controlling the energization of the motor including a switch having an operating connection with the orbital element for automatically closing the switch to maintain the motor energized during said partial revolution of the element and opening the switch to de-energize the motor when the accumulator is charged.

11. An electric motor driven energy storing overrunning operating device having in combination a movable load operating member, an energy accumulator having connections with the member to charge the accumulator for biasing the member to move from one position to another position to operate a load, an orbital element having an operating connection with the member to drive the element from a predetermined angular position through a partial revolution upon movement of the member by the energy accumulator from one position to the other position and to drive the member from the other position to the one position to charge the accumulator during the remainder of each revolution of the element, an electric motor having mechanism for driving the orbital element during each revolution thereof and including an overrunning driving connection for overrunning when the load operating member drives the orbital element, and switching means for controlling the energization of the motor including a switch having an operating cam rotatable jointly with the orbital element for opening the switch to de-energize the motor when the element approaches the predetermined angular position.

12. An electric motor driven energy storing overrunning operating device having in combination a movable load operating member, an energy accumulator having connections with the member to charge the accumulator for biasing the member to move from one position to another position to operate a load, an orbital element having an operating connection with the member to drive the element from a predetermined angular position through a partial revolution upon movement of the member by the energy accumulator from one position to the other position and to drive the member from the other position to the one position to charge the accumulator during the remainder of each revolution of the element, an electric motor having mechanism for driving the orbital element during each revolution thereof and including an overrunning driving connection for overrunning when the load operating member drives the orbital element, and switching means for controlling the energization of the motor including a manually operable switch for energizing the motor and a second switch having an operating connection with the orbital element for automatically closing the second switch to maintain the motor energized and for automatically opening the second switch to de-energize the motor when the element approaches the predetermined angular position.

JOHN A. FAVRE.

References Cited in the file of this patent

UNITED STATES PATENTS

| Number | Name | Date |
|---|---|---|
| 1,444,556 | Sachs | Feb. 6, 1923 |
| 1,672,400 | West | June 5, 1928 |
| 1,873,380 | Gibson | Aug. 23, 1932 |
| 1,909,099 | Gessner | May 16, 1933 |

FOREIGN PATENTS

| Number | Country | Date |
|---|---|---|
| 8,241 | France | Feb. 8, 1908 |
| 691,985 | Germany | June 10, 1940 |